United States Patent

[11] 3,621,339

| [72] | Inventor | Alfred W. Hodgson<br>Orchard Park, N.Y. |
|---|---|---|
| [21] | Appl. No. | 30,409 |
| [22] | Filed | Apr. 21, 1970 |
| [45] | Patented | Nov. 16, 1971 |
| [73] | Assignee | Westinghouse Electric Corporation<br>Pittsburgh, Pa. |

[54] MODULAR HIGH-VOLTAGE ELECTRICAL COMPONENTS COOPERATING WITHIN CABINET HOUSING TO PROVIDE ELECTRICAL INSULATION AND COOLING AIR PASSAGE
4 Claims, 5 Drawing Figs.

[52] U.S. Cl.................................................... 317/103,
174/16 R, 317/100, 317/114
[51] Int. Cl......................................................... H02b 1/04
[50] Field of Search............................................ 174/16 R;
200/50 A, 50 AA; 317/103, 112, 114, 116;
337/188, 189, 191–194

[56] References Cited
UNITED STATES PATENTS

| 3,014,158 | 12/1961 | Nelson .......................... | 174/16 |
| 3,122,615 | 2/1964 | Chace .......................... | 200/50 AA |
| 3,210,456 | 10/1965 | Skubal.......................... | 174/16 |
| 3,264,431 | 8/1966 | Hodgson ....................... | 200/14 X |
| 3,283,214 | 11/1966 | Ortwig.......................... | 317/114 |
| 3,364,838 | 1/1968 | Bradley ......................... | 174/16 X |

*Primary Examiner*—Lewis H. Myers
*Assistant Examiner*—Gerald P. Tolin
*Attorneys*—F. H. Henson, C. F. Renz and M. P. Lynch

ABSTRACT: The invention relates to a high-voltage starter apparatus which is capable of accepting as modular plug-in units the standard components of a high-voltage starter such as a power fuse assembly, a contactor assembly and an isolating switch assembly while isolating the low-voltage control circuitry associated with the high-voltage starter so as to provide safe, separate access to the low-voltage circuitry.

MODULAR HIGH-VOLTAGE ELECTRICAL COMPONENTS COOPERATING WITHIN CABINET HOUSING TO PROVIDE ELECTRICAL INSULATION AND COOLING AIR PASSAGE

BACKGROUND OF THE INVENTION

Numerous techniques for packaging high-voltage starters are presently in use, some of which emphasize the desirability of isolating high-voltage circuits from the low-voltage circuits through the use of separately enclosed cabinets. Conventional packaging techniques fail, however, to provide the flexibility and accessibility required for ease of installation, maintenance and testing.

SUMMARY OF THE INVENTION

The invention relates to apparatus including a single-compartment cabinet housing having electrical terminal assemblies mounted on the backwall of the cabinet to engage plug-in modular assemblies corresponding to the power fuse assembly, contactor assembly and the isolation switch assembly of a high-voltage starter. An interior cabinet partition formed by the engaged modular assemblies defines an electrically isolated cabinet compartment for the low-voltage circuitry associated with the high-voltage starter. Individually operated doors hinged to the front of the cabinet provide separate access to the high- and low-voltage circuitry with the isolation switch functioning to prevent access to the high-voltage circuitry while said high-voltage starter is in an energized state.

The invention will become more readily apparent from the following exemplary description in connection with the accompanying drawings.

DESCRIPTION OF THE PREFERRED EMBODIMENT

Figure 1:
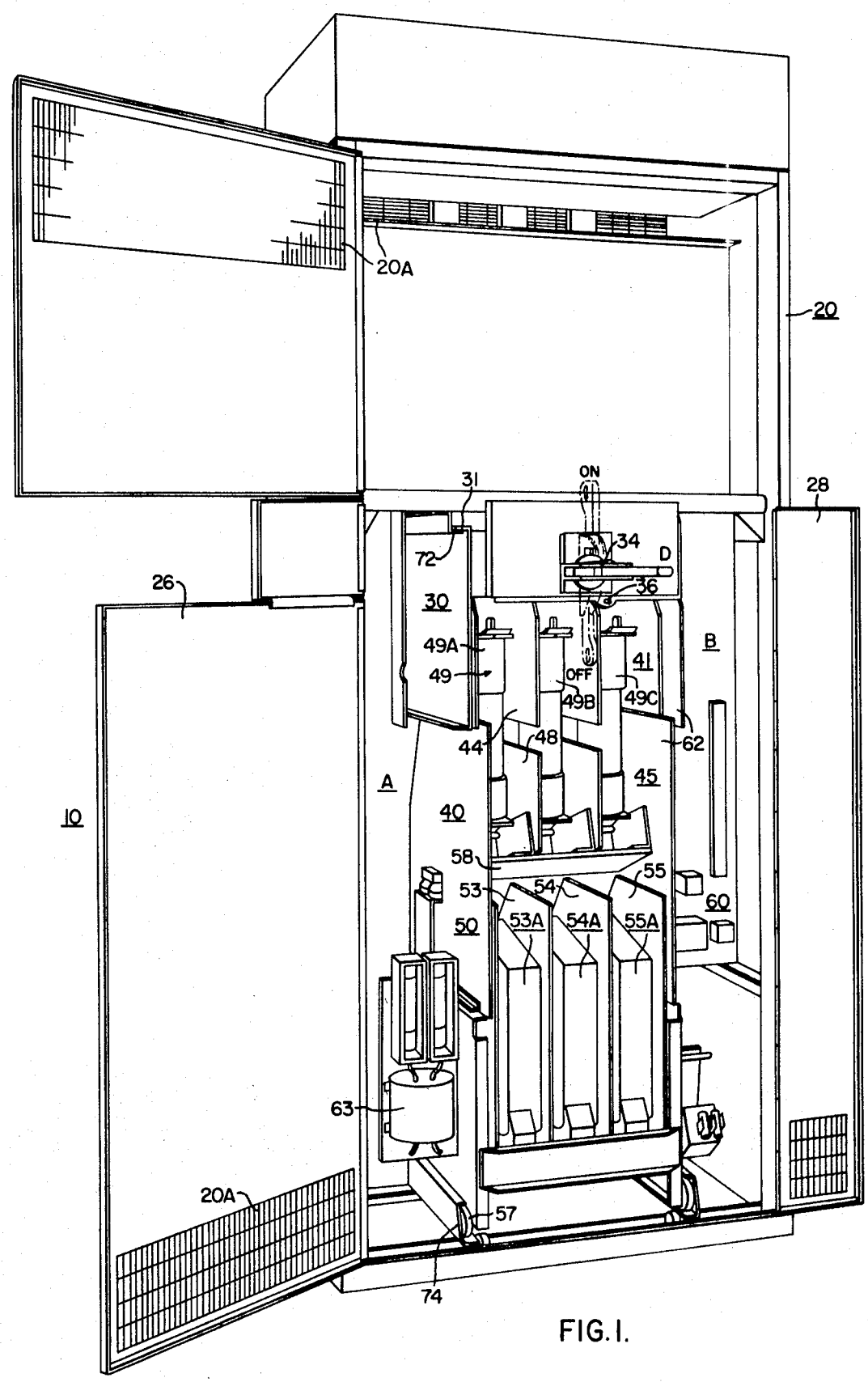
FIG. 1 is a front view in perspective of a nonreversing high-voltage motor starter embodying the invention.
Figure 2:
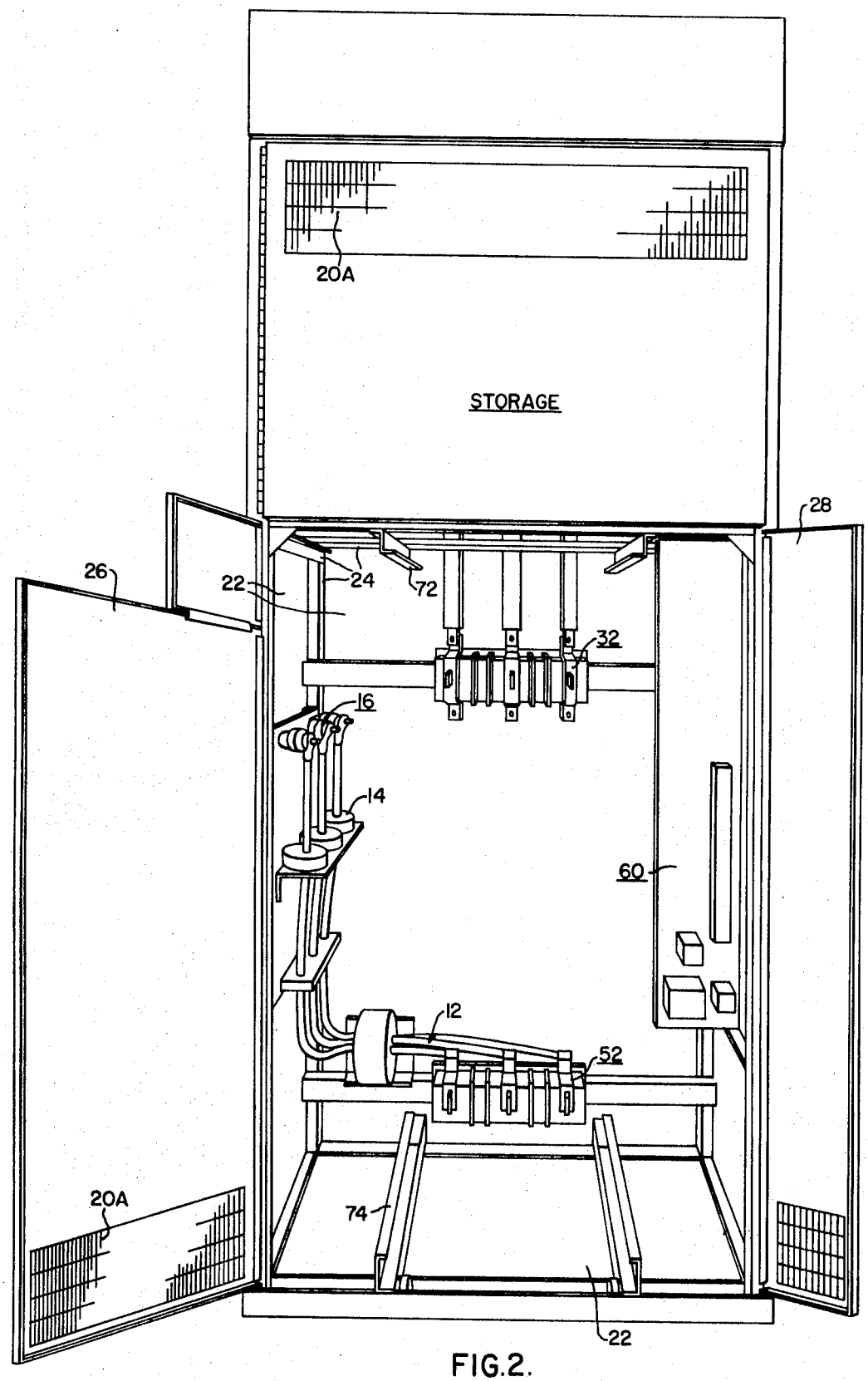
FIG. 2 is a front view in perspective of the cabinet housing of FIG. 1.

In FIG. 1 there is illustrated a nonreversing high-voltage motor starter apparatus 10 that comprises a cabinet housing 20 in which high-voltage modular plug-in assemblies corresponding to an isolating switch assembly 30, a power fuse assembly 40 and a contactor assembly 50 are secured. The cabinet housing 20 is illustrated in FIG. 2 as comprising panels 22 and support structure 24 assembled to form a front entry single-compartment cabinet with access provided by hinged access doors 26 and 28. Mounted on the interior surface of the back panel are electrical terminal assemblies 32 and 52 which electrically engage the isolating switch assembly 30 and the contactor assembly 50 respectively. The three-phase output power developed by the high-voltage apparatus 10 is conducted through cables 12, which pass through current transformers 14, to a load terminal assembly 16 for connection to a remote electrical load (not shown). Secured to the interior surface of the right side panel of the cabinet housing is the low-voltage circuitry 60 which is electrically connected through suitable transformer means 63 to provide safe access for monitoring the operation of the high-voltage plug-in assemblies.

The nonreversing high-voltage motor starter apparatus 10 of FIG. 1 requires a single contactor assembly 50 and therefore supports the compact modular packaging scheme illustrated in which the modular assemblies 30, 40, and 50 can be quickly removed from the housing cabinet 20 merely by sliding the assemblies forward through the cabinet opening provided by the access door 26.

Figure 3:
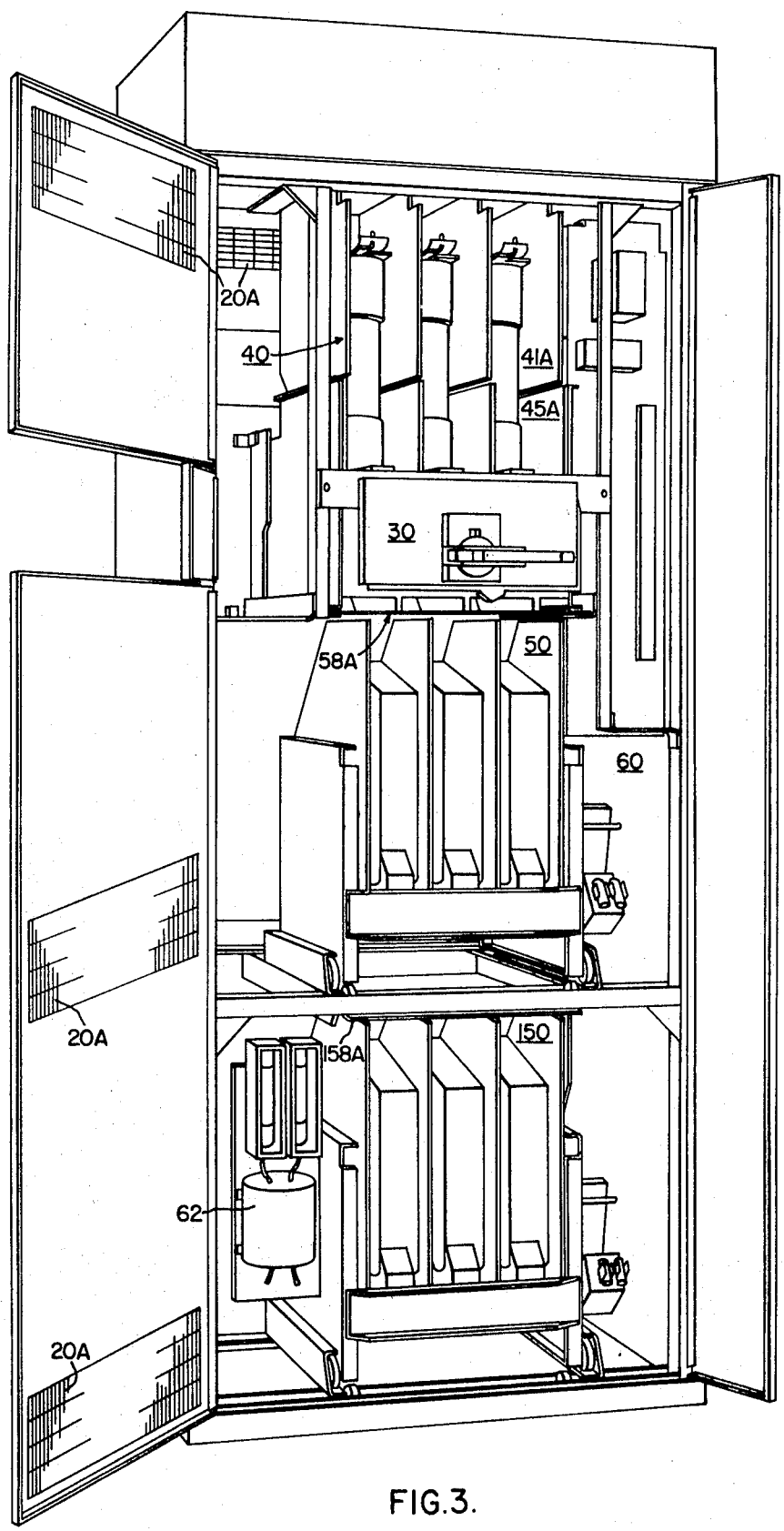
FIG. 3 is a perspective view of an alternate embodiment of the invention.
Figure 5:
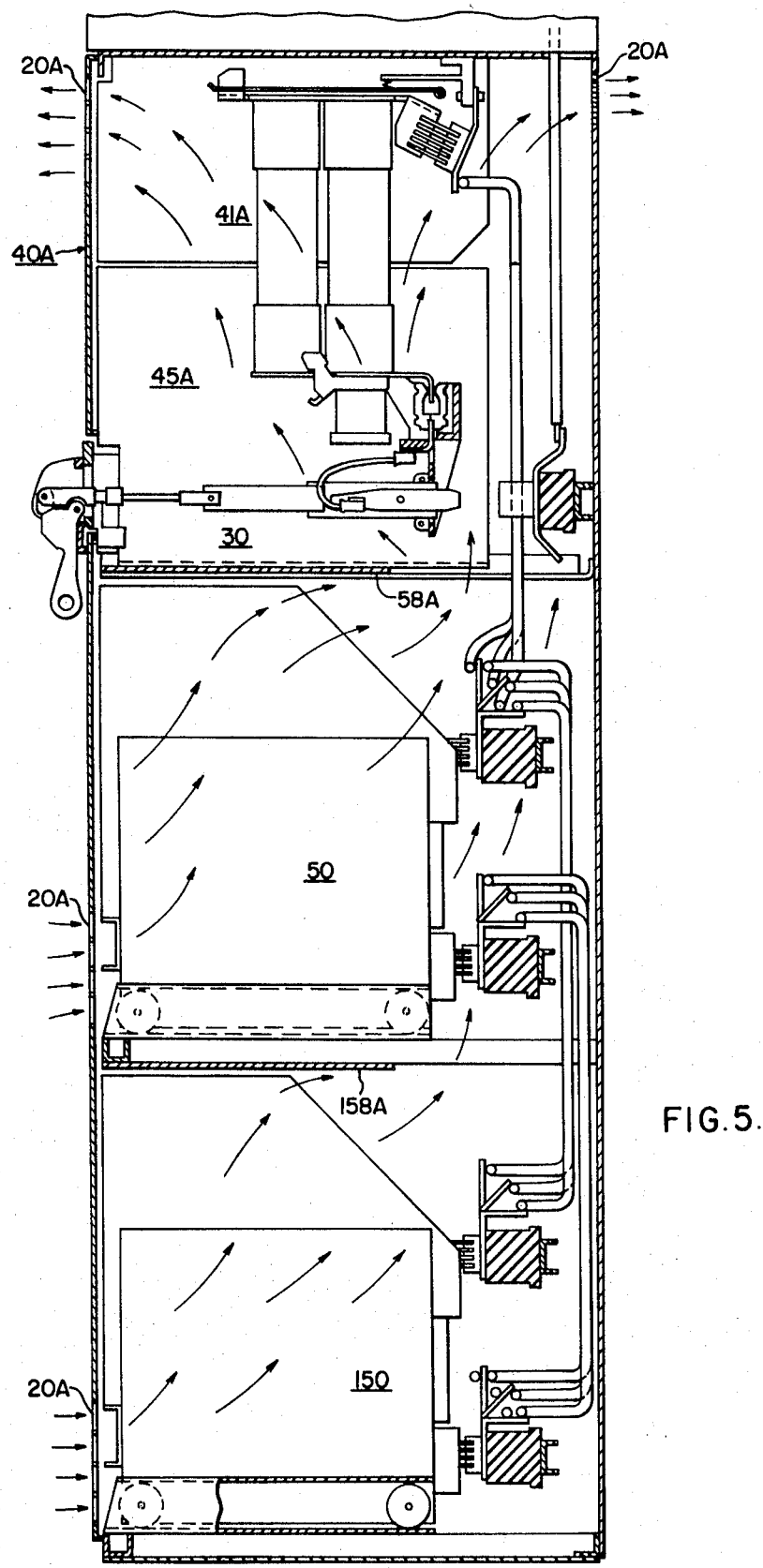
FIG. 5 is a schematic illustration of the electrical interconnect arrangement of the assemblies of FIG. 3.

This modular packaging technique is equally applicable to a reversing motor starter which requires a second contactor assembly 150 as illustrated in FIGS. 3 and 5 by providing an additional electrical terminal on the backwall of the cabinet housing and utilizing the cabinet space labeled as Storage for the power fuse assembly 40.

Figure 4:
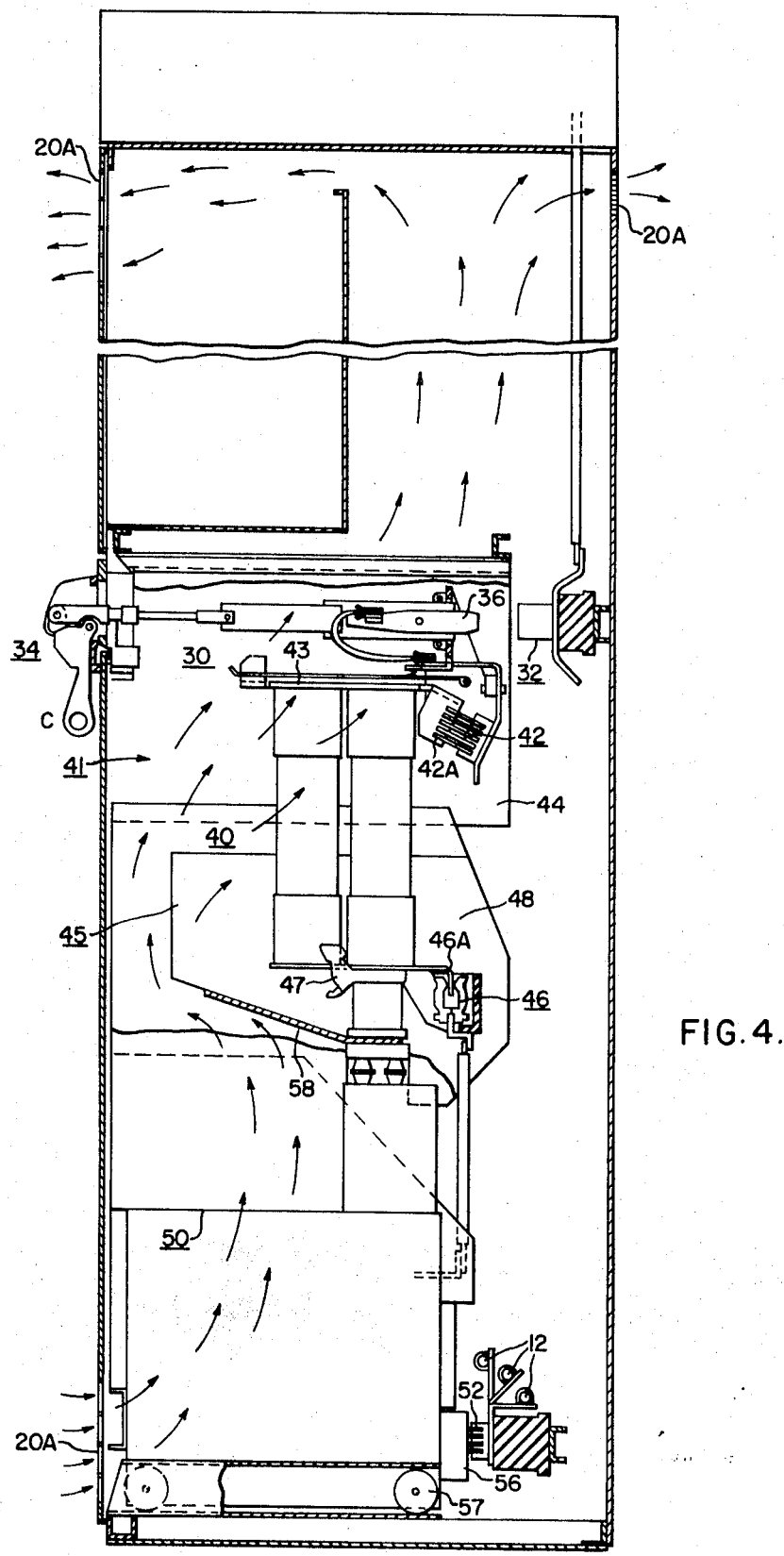
FIG. 4 is a schematic illustration of the electrical interconnect arrangement of the assemblies of FIG. 1.

The high-voltage starter apparatus corresponding to the nonreversing motor starter is schematically illustrated in FIG. 4. The isolation switch assembly 30 and the power fuse assembly 40 are the subject matter of the inventor's cofiled patent applications Ser. Nos. 30,514 and 30,515 respectively, which have been assigned to the assignee of the present invention.

Sidewalls 62 of the modular assemblies 30, 40, and 50 cooperate in an overlapping relationship in the cabinet housing 20 to define two cabinet compartments A and B. Compartment A is designated the high-voltage component compartment with access provided by door 26 and compartment B is designated the low-voltage circuitry compartment with access provided by door 28.

As seen in FIGS. 1 and 4, the isolation switch assembly 30 comprises a rotatable handle mechanism 34 which controls the positioning of electrical contacts 36 to engage and disengage electrical contact with the main power lines which terminate at the electrical terminal assembly 32. The location of the isolation switch assembly 30 in the cabinet housing 20 is selected to position the handle mechanism 34 at a convenient operator height.

The handle mechanism 34 is described in more detail in the applicant's U.S. Pat. No. 3,264,431 issued Aug. 2, 1966, and assigned to the assignee of the present invention.

Access to the high-voltage compartment A is prevented by an interlock system (not shown) when the handle mechanism is in either the OFF or ON position. Access to compartment A is permitted when the handle mechanism 34 is rotated to position D. Spring loaded pin 36 must be manually depressed before the handle mechanism 34 can be rotated, thus preventing inadvertent isolation of the handle mechanism. Access to the low-voltage compartment B is provided by door 28 regardless of the position of the handle mechanism 34.

The contactor assembly 50 comprises electrically isolated contactor poles 53, 54, and 55 which accommodate the individual arc chutes 53A, 54A, and 55A respectively. The contactors represent commercially available components such as the Westinghouse Electric Corporation contactor Type LF. Contactor electrical terminal 56, as illustrated in FIG. 4, engage electrical terminal assembly 52 to supply voltage through the cables 12 to the remote load.

The power fuse assembly 40 is comprised of two sections 41 and 45 which are secured respectively to the isolation switch assembly 30 and the contactor assembly 50. Section 41 includes electrical terminals 42, spring-loaded locking arms 43 and electrical insulating partitions 44. Section 45 includes electrical terminals 46, fuse-engaging plates 47 and electrical-insulating partitions 48. The positioning of the isolation switch assembly 30 and the contactor assembly 50 in the cabinet housing 20 combines the sections 41 and 45 to form he individual fuse compartments 49 which accommodate fuse units 49A, 49B, and 49C. The fuse units include electrical terminals 42A and 46A which mate with the electrical terminals 42 and 46 respectively to provide electrical continuity between the isolation switch assembly 30 and the contactor assembly 50.

The isolation switch assembly 30 is slidably positioned in the cabinet housing 20 by outwardly protruding flanges 31 which engage horizontal guide tracks 72.

Due to the weight of the contactor assembly 50 it is generally located in the bottom section of the cabinet housing 20. The positioning of the contactor assembly 50 within the cabinet housing 20 is accomplished by inserting the wheels 57, which are affixed at the four corners of the base of the assembly 50, into the guide tracks 74 and rolling the assembly into the cabinet housing 20 until electrical engagement with electrical terminal assembly 52 occurs.

Cooling of the high-voltage compartment A is provided by a convection flow pattern of air through the cabinet louvers 20A as indicated by the solid arrows in FIG. 4.

Due to the compact vertical packaging of the assemblies, a deflector plate 58 is positioned immediately above the contactor assembly to intercept the flow of air entering through cabinet louvers 20A and passing through the contactor assembly 50. The deflector plate produces turbulence in the airflow which results in deionization of ionized gases emitted by the contactor which ionized gases might otherwise produce electrical short circuits in the power fuse assembly 40. The airflow pattern produces direct cooling of the contactor assembly 50, the power fuse assembly 40, and the isolation switch assembly 30.

Additionally, the deflector 58 provides a convenient support upon which the fuse units may be rested during insertion and removal operations.

In the reversing motor starter embodiment illustrated in FIGS. 3 and 5, the power fuse section 41A which corresponds to section 41 of the nonreversing motor apparatus is mounted within the top portion of the cabinet housing 20. The power fuse section 45A which corresponds to section 45 of the nonreversing motor starter is secured to the isolation switch assembly 30. The positioning of the power fuse assembly 40A in the top portion of the cabinet provides the cabinet space required to accommodate the two contactor assemblies 50 and 150.

Cooling airflow through the reversing motor starter is intercepted by the deflectors 58A and 158A which function to deionize the gases emitted by contactor assemblies 50 and 150 as described above.

I claim:

1. In a high-voltage starter apparatus, the combination of, a cabinet housing having top, bottom, back and side panels and having a first and second front opening access door forming an interior cabinet housing volume free of interior walls and partitions, a first electrical terminal assembly and a second electrical terminal assembly mounted on the interior surface of the back panel, said first electrical terminal assembly being operatively connected to a source of main electrical power, said second electrical terminal assembly being operatively connected to a remote electrical load, an isolation switch assembly having first vertically extending side panels positioned within said cabinet housing through the cabinet opening corresponding to said first access door, said isolation switch assembly including a handle mechanism manually controlling of electrical engagement and disengagement between the isolation switch assembly and said first electrical terminal assembly, said isolation switch assembly including first power fuse terminal means positioned between said first vertically extending side panels, a contactor assembly having a second set of vertically extending side panels and second power fuse terminal means positioned between said second set of vertically extending side panels positioned within said cabinet housing through the cabinet opening corresponding to said first access door to electrically engage said second terminal assembly, a power fuse assembly establishing electrical continuity between said isolation switch assembly and said contactor assembly, and connected between said first and second power fuse terminal means, said positioning of said isolation switch assembly and said contactor assembly within said cabinet housing aligning said first and second sets of side panels and said first and second power fuse terminal means so as to form a power fuse assembly means between said isolation switch assembly and said contactor assembly, a side panel of said first set of side panels cooperating with a side panel of said second set of side panels to effectively divide said interior volume of said cabinet assembly into a high-voltage compartment corresponding to the cabinet opening corresponding to said first access door and a low-voltage compartment corresponding to the cabinet opening corresponding to said second access door.

2. In apparatus as claimed in claim 1 wherein said cabinet housing includes apertures for sustaining a flow of cool air within said high-voltage compartment from the base of the cabinet to the top of the cabinet, said first and second sets of side panels cooperating to form a cooling airflow passage through said contactor assembly, said power fuse assembly, and said isolation switch assembly, and further including plate means extending between the sidewalls of said second set of sidewalls and extending over said contactor assembly so as to partially interfere with the flow of said cooling air for deionizing gas formed by the operation of said contactor assembly.

3. In a high-voltage starter apparatus, the combination of, a cabinet housing having a top, bottom, back and side panels and having a first and second front-opening access door, a first electrical terminal assembly, a second electrical terminal assembly and a third electrical terminal assembly mounted on the interior surface of the back panel, said first electrical terminal assembly being operatively connected to a source of main electrical power, said second and third electrical terminal assemblies being operatively connected to a remote electrical load, a first set of vertically extending panel members mounted on the interior surface of the top panel and extending vertically downwardly therefrom and a first power fuse terminal means secured between said panels, means for electrically interconnecting said first power fuse terminal means and said second and third electrical terminal assemblies, an isolation switch assembly having a second set of vertically extending panel members and second power fuse terminal means secured therebetween positioned within said cabinet housing through the cabinet opening corresponding to said first access door, said isolation switch assembly including a handle mechanism manually controlling engagement nd disengagement between the isolation switch assembly and said first electrical terminal assembly, said first set of vertically extending panel members and said first power fuse terminal means cooperating with said second set of vertically extending panel members and said second power fuse terminal means to form a power fuse assembly accommodating vertically positioned power fuse elements, a first contactor assembly having a third set of vertically extending panel members positioned within the cabinet opening corresponding to said first access door electrically engage said second terminal assembly, a second contactor assembly having a fourth set of vertically extending panel members positioned within said cabinet housing to the cabinet opening corresponding to said first access door to electrically engage said third terminal assembly, one of said panel member of each of said third and fourth sets of vertically extending panel members cooperating with one of said panel members of each of said first and second sets of panel members to form a vertical interior wall within said cabinet housing to divide said cabinet housing into a high-voltage compartment corresponding to the cabinet opening corresponding to said first access door and a low-voltage compartment corresponding to the cabinet opening corresponding to said second access door.

4. In apparatus as claimed in claim 3 wherein said cabinet housing includes apertures at the top and bottom to support cooling airflow through said cabinet interior corresponding to said high-voltage compartment, said first, second, third, and fourth sets of panel members forming a cooling air passage within said cabinet housing, and including first and second plate means extending above said first and second contactor assemblies to disrupt said airflow within said passage sufficiently for deionizing gas formed by the operation of said contactor assembly.

* * * * *